(12) United States Patent
Smalley et al.

(10) Patent No.: US 7,125,534 B1
(45) Date of Patent: Oct. 24, 2006

(54) CATALYTIC GROWTH OF SINGLE- AND DOUBLE-WALL CARBON NANOTUBES FROM METAL PARTICLES

(75) Inventors: Richard E. Smalley, Houston, TX (US); Jason H. Hafner, Somerville, MA (US); Daniel T. Colbert, Houston, TX (US); Kenneth Smith, Katy, TX (US)

(73) Assignee: William Marsh Rice University, Houston, TX (US)

( * ) Notice: Subject to any disclaimer, the term of this patent is extended or adjusted under 35 U.S.C. 154(b) by 483 days.

(21) Appl. No.: 10/324,861

(22) Filed: Dec. 20, 2002

Related U.S. Application Data

(62) Division of application No. 09/787,582, filed as application No. PCT/US99/21367 on Sep. 17, 1999, now Pat. No. 6,692,717.

(60) Provisional application No. 60/101,093, filed on Sep. 18, 1998.

(51) Int. Cl.
*D01F 9/12* (2006.01)
(52) U.S. Cl. .................. 423/447.3; 423/447.1
(58) Field of Classification Search ............. 423/447.3, 423/447.1, 447.2, 445 R, 445 B
See application file for complete search history.

(56) References Cited

U.S. PATENT DOCUMENTS

| 5,300,203 | A | 4/1994 | Smalley | 204/157.41 |
|---|---|---|---|---|
| 5,424,054 | A | 6/1995 | Bethune et al. | 423/447.2 |
| 6,183,714 | B1 | 2/2001 | Smalley et al. | 423/447.3 |
| 6,221,330 | B1 | 4/2001 | Moy et al. | 423/447.3 |
| 6,346,189 | B1 * | 2/2002 | Dai et al. | 205/766 |

FOREIGN PATENT DOCUMENTS

| WO | WO 89/07163 A1 | 8/1989 |
|---|---|---|
| WO | WO 97/09272 A1 | 3/1997 |
| WO | WO 00/73205 A1 | 12/2000 |

OTHER PUBLICATIONS

Ajayan et al., "Growth morphologies during cobalt-catalyzed single-shell carbon nanotube synthesis," *Chemical Physics Letters*, vol. 215, No. 5, pp. 509-517 (Dec. 10, 1993).
Bethune et al., "Cobalt-catalysed growth of carbon nanotubes with single-atomic-layer walls," *Nature*, vol. 363, pp. 605-607 (Jun. 17, 1993).
Brotons et al., "Catalytic influence of bimetallic phases for the synthesis of single-walled carbon nanotubes," *Journal of Molecular Catalysis A: Chemical*, vol. 116, pp. 397-403 (1997).
Cassell et al., "Large Scale CVD Synthesis of Single-Walled Carbon Nanotubes," *J. Phys. Chem. B.*, vol. 103, No. 31, pp. 6484-6492 (1999).
Charlier et al., "Microscopic Growth Mechanisms for Carbon Nanotubes," *Science*, vol. 275, pp. 646-649 (Jan. 31, 1997).
Colomer et al., "Large-scale synthesis of single-wall carbon nanotubes by catalytic chemical vapor deposition (CCVD) method," *Chemical Physics Letters*, vol. 317, pp. 83-89 (Jan. 28, 2000).
Colomer et al., "Synthesis of single-wall carbon nanotubes by catalytic decomposition of hydrocarbons," *Chemical Communications*, pp. 1343-1344 (1999).
Dai et al., "Single-wall nanotubes produced by metal-catalyzed disproportionation of carbon monoxide," *Chemical Physics Letters*, vol. 260, pp. 471-475 (Sep. 27, 1996).
Ebbesen, "Carbon Nanotubes," *Annual Review of Materials Science*, vol. 24, pp. 235-264 (1994).
Ebbesen et al., "Large-scale synthesis of carbon nanotubes," *Nature*, vol. 358, pp. 220-222 (Jul. 16, 1992).
Flahaut et al., "Synthesis of single-walled carbon nanotube-Co-MgO composite powders and extraction of the nanotubes," *Journal of Materials Communication*, vol. 10, pp. 249-252 (2000).
Flahaut et al., "Synthesis of single-walled carbon nanotubes using binary (Fe, Co, Ni) alloy nanoparticles prepared in situ by the reduction of oxide solid solutions," *Chemical Physics Letters*, vol. 300, pp. 236-242 (Jan. 29, 1999).
Fonseca et al., "Synthesis of single- and multi-wall carbon nanotubes over supported catalysts," *Applied Physics A: Materials Science & Processing*, vol. 67, pp. 11-22 (Jul. 1998).
Franklin et al., "An Enhanced CVD Approach to Extensive Nanotube Networks with Directionality," *Advanced Materials*, vol. 12, No. 12, pp. 890-894 (2000).

(Continued)

*Primary Examiner*—Stanley S. Silverman
*Assistant Examiner*—Peter J Lish
(74) *Attorney, Agent, or Firm*—Ross Spencer Garsson; Edward T. Mickelson; Winstead Sechrest & Minick P.C.

(57) ABSTRACT

Single-walled carbon nanotubes have been synthesized by the catalytic decomposition of both carbon monoxide and ethylene over a supported metal catalyst known to produce larger multi-walled nanotubes. Under certain conditions, there is no termination of nanotube growth, and production appears to be limited only by the diffusion of reactant gas through the product nanotube mat that covers the catalyst. The present invention concerns a catalyst-substrate system which promotes the growth of nanotubes that are predominantly single-walled tubes in a specific size range, rather than the large irregular-sized multi-walled carbon fibrils that are known to grow from supported catalysts. With development of the supported catalyst system to provide an effective means for production of single-wall nanotubes, and further development of the catalyst geometry to overcome the diffusion limitation, the present invention will allow bulk catalytic production of predominantly single-wall carbon nanotubes from metal catalysts located on a catalyst supporting surface.

29 Claims, 6 Drawing Sheets

OTHER PUBLICATIONS

Guo et al., "Catalytic growth of single-walled nanotubes by laser vaporization," *Chemical Physics Letters*, vol. 243, pp. 49-54 (Sep. 8, 1995).

Guo et al., "Production of Single-Walled Carbon Nanotubes Via Laser Vaporization Technique," *Electrochemical Society Proceedings*, vol. 95, No. 10, pp. 636-647 (May 16, 1995).

Guo et al., "Self-Assembly of Tubular Fullerenes," *J. Phys. Chem.*, vol. 99, No. 27, pp. 10694-10697 (1995).

Hafner et al., "Catalytic growth of single-walled carbon nanotubes from metal particles," *Chemical Physics Letters*, vol. 296, pp. 195-202 (Oct. 30, 1998).

Hernadi et al., "Catalytic synthesis of carbon nanotubes using zeolite support," *Zeolites*, vol. 17, pp. 416-423 (1996).

Hernadi et al., "Fe-Catalyzed Carbon Nanotube Formation," *Carbon*, vol. 34, No. 10, pp. 1249-1257 (1996).

Hornyak et al., "Template Synthesis of Carbon Nanotubes," *NanoStructured Materials*, vol. 12, pp. 83-88 (1999).

Iijima, "Helical microtubules of graphitic carbon," *Nature*, vol. 354, pp. 56-58 (Nov. 7, 1991).

Iijima et al., "Single-shell carbon nanotubes of 1-nm diameter," *Nature*, vol. 363, pp. 603-605 (Jun. 17, 1993).

Journet et al., "Large-scale production of single-walled carbon nanotubes by the electric-arc technique," *Nature*, vol. 388, pp. 756-758 (Aug. 21, 1997).

Kitiyanan et al., "Controlled production of single-wall carbon nanotubes by catalytic decomposition of CO on bimetallic Co-Mo catalysts," *Chemical Physics Letters*, vol. 317, pp. 497-503 (Feb. 4, 2000).

Kong et al., "Synthesis, integration, and electrical properties of individual single-walled carbon nanotubes," *Applied Physics A: Materials Science & Processing*, vol. 69, pp. 305-308 (1999).

Kong et al., "Synthesis of individual single-walled carbon nanotubes on patterned silicon wafers," *Nature*, vol. 395, pp. 878-881 (Oct. 29, 1998).

Lambert et al., "Improving conditions towards isolating single-shell carbon nanotubes," *Chemical Physics Letters*, vol. 226, pp. 364-371 (Aug. 19, 1994).

Li et al., "Large-Scale Synthesis of Aligned Carbon Nanotubes," *Science*, vol. 274, pp. 1701-1703 (Dec. 6, 1996).

Liu et al., "Synthesis and characterization of single-walled nanotubes with Ce/Ni as catalysts," *Chemical Physics Letters*, vol. 320, pp. 365-372 (Apr. 7, 2000).

Mukhopadhyay et al., "Bulk production of quasi-aligned carbon nanotube bundles by the catalytic chemical vapour deposition (CCVD) method," *Chemical Physics Letters*, vol. 303, pp. 117-124 (Apr. 2, 1999).

Odom et al., "Atomic structure and electronic properties and single-walled carbon nanotubes," *Nature*, vol. 391, pp. 62-64 (Jan. 1, 1998).

Saito et al., "Carbon Nanocapsules Encaging Metals and Carbides," *J. Phys. Chem. Solids*, vol. 54, No. 12, pp. 1849-1860 (1993).

Saito et al., "Extrusion of single-wall carbon nanotubes via formation of small particles condensed near an arc evaporation source," *Chemical Physics Letters*, vol. 236, pp. 419-426 (Apr. 21, 1995).

Satishkumar et al., "Single-walled nanotubes by the pyrolysis of acetylene-organometallic mixtures," *Chemical Physics Letters*, vol. 293, pp. 47-52 (Aug. 21, 1998).

Seraphin et al., "Single-walled carbon nanotubes produced at high yield by mixed catalysts," *Applied Physics Letters*, vol. 64, No. 16, pp. 2087-2089 (Apr. 18, 1994).

Seraphin, "Single-Walled Tubes and Encapsulation of Nanocrystals into Carbon Clusters," *J. Electrochem Soc.*, vol. 142, No. 1, pp. 290-297 (Jan. 1995).

Su et al., "A scalable CVD method for the synthesis of single-walled carbon nanotubes with high catalyst productivity," *Chemical Physics Letters*, vol. 322, pp. 321-326 (May 26, 2000).

Takizawa et al., "Change of tube diameter distribution of single-wall carbon nanotubes induced by changing the bimetallic ratio of Ni and Y catalysts," *Chemical Physics Letters*, vol. 326, pp. 351-357 (Aug. 18, 2000).

Thess et al., "Crystalline Ropes of Metallic Carbon Nanotubes," *Science*, vol. 273, pp. 483-487 (Jul. 26, 1996).

Vander Wal et al., "Flame Synthesis of Metal-Catalyzed Single-Wall Carbon Nanotubes," *J. Phys. Chem A*, vol. 104, No. 31, pp. 7209-7217 (2000).

Wildöer et al., "Electronic structure of atomically resolved carbon nanotubes," *Nature*, vol. 391, pp. 59-62 (Jan. 1, 1998).

Yudasaka et al., "Mechanism of the Effect of NiCo, Ni and Co Catalysts on the Yield of Single-Wall Carbon Nanotubes Formed by Pulsed Nd:YAG Laser Ablation," *J. Phys. Chem. B.*, vol. 103, No. 30, pp. 6224-6229 (1999).

Yudasaka et al., "Specific conditions for Ni catalyzed carbon nanotube growth by chemical vapor deposition," *Applied Physics Letters*, vol. 67, No. 17, pp. 2477-2479 (Oct. 23, 1995).

Zhou et al., "Single-walled carbon nanotubes, growing radially from $YC_2$ particles," *Applied Physics Letters*, vol. 65, No. 12, pp. 1593-1595 (Sep. 19, 1994).

\* cited by examiner

CATALYTIC GROWTH OF SINGLE- AND DOUBLE-WALL CARBON NANOTUBES FROM METAL PARTICLES

PRIORITY BENEFIT

This is a divisional of application Ser. No. 09/787,582 filed Mar. 16, 2001, now U.S. Pat. No. 6,692,717 which is a 371 National Phase application of international application serial no. PCT/US99/21367 filed Sep. 17, 1999, which claims benefit of patent application Ser. No. 60/101,093, filed Sep. 18, 1998.

GOVERNMENT GRANTS

This invention was made with United States Government support under United States Grant No. 961240 and Grant No. DMR-9522251 awarded by the National Aeronautical and Space Administration—Jet Propulsion Laboratory and the National Science Foundation, respectively. The United states Government may have certain rights in the invention.

BACKGROUND OF THE INVENTION

1. Field of the Invention

This invention relates generally to methods of producing single-wall carbon nanotubes, and to catalysts for use in such methods.

2. Description of Related Art

Fullerenes are closed-cage molecules composed entirely of sp2-hybridized carbons, arranged in hexagons and pentagons. Fullerenes (e.g., C60) were first identified as closed spheroidal cages produced by condensation from vaporized carbon.

Fullerene tubes are produced in carbon deposits on the cathode in carbon are methods of producing spheroidal fullerenes from vaporized carbon. Ebbesen et al. (Ebbesen I), "Large-Scale Synthesis Of Carbon Nanotubes," Nature, Vol. 358, p. 220 (Jul. 16, 1992) and Ebbesen et al., (Ebbesen II), "Carbon Nanotubes," Annual Review of Materials Science, Vol. 24, p. 235 (1994). Such tubes are referred to herein as carbon nanotubes. Many of the carbon nanotubes made by these processes were multi-wall nanotubes, i.e., the carbon nanotubes resembled concentric cylinders. Carbon nanotubes having multiple walls have been described in the prior art. Ebbesen II; Iijima et al., "Helical Microtubules Of Graphitic Carbon," Nature, Vol. 354, p. 56 (Nov. 7, 1991).

Another known way to synthesize nanotubes is by catalytic decomposition of a carbon-containing gas by nanometer-scale metal particles supported on a substrate. The carbon feedstock molecules decompose on the particle surface, and the resulting carbon atoms then diffuse through the particle and precipitate as part of nanotubes growing from one side of the particle. This procedure typically produces imperfect multi-walled nanotubes in high yield. See C. E. Snyder et al., International Patent Application WO 89/07163 (1989), hereby incorporated by reference in its entirety. Its advantage is that it is relatively simple and can be scaled to produce nanotubes by the kilogram.

Single-wall carbon nanotubes have been made in a DC arc discharge apparatus of the type used in fullerene production by simultaneously evaporating carbon and a small percentage of Group VIII transition metal from the anode of the arc discharge apparatus. See Iijima et al., "Single-Shell Carbon Nanotubes of 1 nm Diameter," Nature, Vol. 363, p. 603 (1993); Bethune et al., "Cobalt Catalyzed Growth of Carbon Nanotubes with Single Atomic Layer Walls," Nature, Vol. 63, p. 605 (1993); Ajayan et al., "Growth Morphologies During Cobalt Catalyzed Single-Shell Carbon Nanotube Synthesis," Chem. Phys. Lett., Vol. 215, p. 509 (1993); Zhou et al., "Single-Walled Carbon Nanotubes Growing Radially From YC2 Particles," Appl. Phys. Lett., Vol. 65, p. 1593 (1994); Seraphin et al., "Single-Walled Tubes and Encapsulation of Nanocrystals Into Carbon Clusters," Electrochem. Soc., Vol. 142, p. 290 (1995); Saito et al., "Carbon Nanocapsules Encaging Metals and Carbides," J. Phys. Chem. Solids, Vol. 54, p. 1849 (1993); Saito et al., "Extrusion of Single-Wall Carbon-Nanotubes Via Formation of Small Particles Condensed Near an Evaporation Source," Chem. Phys. Lett., Vol. 236, p. 419 (1995). It is also known that the use of mixtures of such transition metals can significantly enhance the yield of single-wall carbon nanotubes in the arc discharge apparatus. See Lambert et al., "Improving Conditions Toward Isolating Single-Shell Carbon Nanotubes," Chem. Phys. Lett., Vol. 226, p. 364 (1994). While this arc discharge process can produce single-wall nanotubes, the yield of nanotubes is low and the tubes exhibit significant variations in structure and size between individual tubes in the mixture. Individual carbon nanotubes are difficult to separate from the other reaction products and purify.

High quality single-wall carbon nanotubes have also been generated by arc evaporation of a graphite rod doped with Y and Ni. See C. Journet et al., Nature 388 (1997) 756, hereby incorporated by reference in its entirety. These techniques allow production of only gram quantities of single-wall carbon nanotubes.

An improved method of producing single-wall nanotubes is described in U.S. Ser. No. 08/687,665, entitled "Ropes of Single-Walled Carbon Nanotubes" incorporated herein by reference in its entirety. This method uses, inter alia, laser vaporization of a graphite substrate doped with transition metal atoms, preferably nickel, cobalt, or a mixture thereof, to produce single-wall carbon nanotubes in yields of at least 50% of the condensed carbon. See A. Thess et al. (1996), *Science* 273:483. The single-wall nanotubes produced by this method tend to be formed in clusters, termed "ropes," of 10 to 1000 single-wall carbon nanotubes in parallel alignment, held together by van der Waals forces in a closely packed triangular lattice. Nanotubes produced by this method vary in structure, although one structure tends to predominate. These high quality samples have for the first time enabled experimental confirmation of the structurally dependent properties predicted for carbon nanotubes. See J. W. G. Wildoer, L. C. Venema, A. G. Rinzler, R. E. Smalley, C Dekker (1998), *Nature,* 391:59; T. W. Odom, J. L. Huang, P. Kim, C. M. Lieber (1998), *Nature,* 391:62.

Although the laser vaporization process produces improved single-wall nanotube preparations, the product is still heterogeneous, and the nanotubes are too tangled for many potential uses of these materials. In addition, the vaporization of carbon is a high-energy process and is inherently costly. Therefore, there remains a need for improved methods of producing single-wall nanotubes of greater purity and homogeneity. Furthermore, applications could make use of the properties of single-wall carbon nanotubes if only they were available in a form where they were attached directly to the surface of a macroscopic object. However, such components have not been produced up to now.

A method of producing carbon fibers from single-wall carbon nanotubes is described in PCT Patent Application No. PCT/US98/04513, incorporated herein by reference in its entirety. The single-wall nanotube molecules are produced in substantially two-dimensional array made up of single-walled nanotubes aggregating (e.g., by van der Waals forces) in substantially parallel orientation to form a monolayer extending in directions substantially perpendicular to the orientation of the individual nanotubes. Such monolayer arrays can be formed by conventional techniques employing "self-assembled monolayers" (SAM) or Langmiur-Blodgett films, see Hirch, pp. 75–76.

Typically, SAMs are created on a substrate which can be a metal (such as gold, mercury or ITO (indium-tin-oxide)). The molecules of interest, here the single-wall nanotube molecules, are linked (usually covalently) to the substrate through a linker moiety such as —S—, —S$(CH_2)_n$—NH—, —SiO$_3$$(CH_2)_3$NH— or the like. The linker moiety may be bound first to the substrate layer or first to the single-wall nanotube molecule (at an open or closed end) to provide for reactive self-assembly. Langmiur-Blodgett films are formed at the interface between two phases, e.g., a hydrocarbon (e.g., benzene or toluene) and water. Orientation in the film is achieved by employing molecules or linkers that have hydrophilic and lipophilic moieties at opposite ends.

The production of single-wall carbon nanotubes by metal-catalyzed disproportionation of carbon monoxide has been reported. See Dai, et al. (1996), *Chem. Phys. Lett.*, 260: 471–475. Preformed catalyst particles were made from a 50:50 mixture of Ni/Co supported on fumed alumina nanoparticles using known methods (See Int. Pat. WO 89/07163 (1989)). The diameter of the single- or multi-wall nanotube structure growing from a catalyst particle is related to the dimensions of the catalyst particle itself. Using the known methods of catalyst particle preparation, it is not possible to provide nanoparticles with a uniform optimum size to produce only single-wall nanotubes, and the growth process of Dai, et al., does not provide high yields of single-wall nanotubes because the larger particles produce multiwall nanotubes.

SUMMARY OF THE INVENTION

This invention provides a method for predominant production of single-wall carbon nanotubes comprising: providing a supported transition metal catalyst supported on an inert surface contacted with a suitable feedstock gas (e.g. CO, or any of the known effective hydrocarbon gasses) at a temperature and pressure at which single-wall carbon nanotube growth occurs. Enhanced rates of production for single-wall nanotubes are provided by first placing catalyst material on an appropriate supporting substrate and treating the catalyst material so that it produces predominantly single-wall carbon nanotubes. At least initially, the conditions ensure that the reaction to form nanotubes is limited by the supply of carbon to the catalytic site, rather than by the rate of diffusion of carbon through the catalytic particle. This may be achieved via a chemical process in which the carbon contained in a controlled amount of feedstock gas interacts with catalyst particles. Under the appropriate conditions carbon in the feedstock gas is formed into single-wall wall nanotubes on the catalyst particles of less than 2-nanometer diameter but is formed into graphitic layers that encapsulate the larger catalyst particles, deactivating them as catalysts. Catalyst particles of greater than about 2 nanometers in diameter are more likely to form multiwall nanotubes, and since they are rendered ineffective by the process, the only remaining active catalyst particles support growth of primarily single-wall nanotubes. In a preferred embodiment, the method of this invention provides for treatment of supported catalyst material to deactivate catalyst particles that do not support growth of the desired nanotube types, with subsequent change of the feedstock composition or density to accelerate growth of the desired form of single-wall nanotubes. The method of this invention is capable of producing material that is >50% SWNT, more typically >90% SWNT, or even >99% SWNT.

This invention also provides a catalyst/support system structured so that access of the feedstock gas to the catalyst is enhanced by that structure. Preferably, the catalyst is deposited so that there is clear distance between catalyst locations by dispersion of small catalyst particles on the substrate surface or other methods of deposition known to those skilled in the art.

The production of high quality single-wall carbon nanotubes, in some cases including double-wall carbon nanotubes, in yields much larger than previously achieved by catalytic decomposition of carbon-containing precursor gases is disclosed. The nanotubes formed are connected to and grow away from the catalyst particles affixed to the catalyst support surface. If the growth time is short, the tubes can be only a fraction of one micron long, but if the growth time is prolonged, single-wall carbon nanotubes in this invention can grow continuously to arbitrary lengths. The present invention demonstrates a means for nucleating and growing nanotubes only from the smallest of the supported catalyst particles, which produce single-wall carbon nanotubes, while deactivating the larger particles so that no multi-walled nanotubes are produced. This allows the growth exclusively of single-wall carbon nanotubes from catalyst systems previously thought to produce only larger diameter multi-walled nanotubes.

According to one embodiment of the present invention, a process for producing single wall carbon nanotubes is disclosed. The process comprises the steps of: (1) providing a supported nanoscale particulate transition metal catalyst in a reaction zone; (2) supplying a gaseous carbon-containing compound to the reaction zone under conditions, at least initially, so that the compound inactivates catalyst particles that have a diameter large enough to catalyze the production of multi-wall carbon nanotubes; and (3) contacting the catalyst particles that have a diameter small enough to catalyze the production of primarily single-wall carbon nanotube which remain active under the conditions with the gaseous carbon-containing compound. The gaseous carbon-containing compound may be a hydrocarbon. In this case, the gaseous hydrocarbon may be supplied to the reaction zone at a rate that is low enough to cause the inactivation of larger diameter catalyst particles while causing the growth of single wall nanotubes from the smaller diameter catalyst particles. Under such conditions, it is believed the larger diameter catalyst particles are inactivated by encapsulation by graphitic layers before any multi-wall carbon nanotubes can grow therefrom. The gaseous carbon-containing compound may also be CO. In this case, the CO is contacted with the supported catalyst at a temperature and pressure that inactivates large diameter catalyst particles but produces single-wall carbon nanotubes in high yield. In either case, the conditions in the reaction zone may be changed, after the inactivation of the larger diameter catalyst particles, to conditions that favor the production of single-wall carbon nanotubes.

The catalyst may include nanoscale transition metal atom clusters supported on a substantially planar support. The transition metal atom clusters may be substantially uniformly disposed on the planar surface in close proximities to one another so that individual single-wall carbon nanotubes, or that bundles or ropes of generally aligned single-wall carbon nanotubes, grow from the supported catalyst particles. Changing the temperature in the reaction zone may selectively change the yield of single-wall carbon nanotubes.

DETAILED DESCRIPTION OF THE EMBODIMENTS

Figure 1:
FIG. 1 is an image of an Individual single-wall nanotubes grown by reacting 1200 sccm CO at 850° C. over an alumina supported Mo particle system.

Carbon has, from its very essence, not only the propensity to self-assemble from a high temperature vapor to form perfect spheroidal closed cages (of which C60 is prototypical), but also (with the aid of a transition metal catalyst) to assemble into perfect single-wall cylindrical tubes. These tubes, which may be thought of as one-dimensional single crystals of carbon, are true fullerene molecules.

Single-wall carbon nanotubes are much more likely to be free of defects than multi-wall carbon nanotubes. Defects in single-wall carbon nanotubes are less likely than defects in multi-walled carbon nanotubes because the latter have neighboring walls that provide for easily-formed defect sites via bridges between unsaturated carbon valances in adjacent tube walls. Since single-wall carbon nanotubes have fewer defects, they are stronger, more conductive, and therefore more useful than multi-wall carbon nanotubes of similar diameter.

Carbon nanotubes may have diameters ranging from about 0.6 nanometers (nm) for a single-wall carbon nanotube up to 3 nm, 5 nm, 10 nm, 30 nm, 60 nm or 100 nm for single-wall or multi-wall carbon nanotubes. The carbon nanotubes may range in length from 5 nm up to 1 millimeter (mm), 1 centimeter (cm), 3 cm, 5 cm, or greater. The process described here enables one to produce high quality single-wall carbon nanotubes, and, in some cases double-wall carbon nanotubes, in yields much larger than previously achieved in growth from supported catalysts. The yield of single-wall carbon nanotubes in the product made by this invention is unusually high. Yields of single-wall carbon nanotubes greater than 90% are possible with this invention. This is achieved by nucleating and growing nanotubes from the smallest of the supported catalyst particles, which produce single-wall carbon nanotubes, and deactivating the larger particles so that few multi-walled nanotubes are produced.

Catalyst Support

This invention deals with development of supported catalyst systems that provide an effective means for production of single-wall nanotubes. Single-walled carbon nanotubes have been synthesized by the catalytic decomposition of both carbon monoxide and ethylene over a supported metal catalyst known to produce larger multi-walled nanotubes. Under certain conditions, there is no termination of nanotube growth, and production appears to be limited only by the diffusion of reactant gas through the product nanotube mat that covers the catalyst. Catalyst geometry may be selected to overcome the diffusion limitation.

Catalyst geometry which may be selected to overcome the negative effects due to restricted gas phase diffusion includes distribution or deposition of catalyst material in specific, separated regions on a supporting structure. Such catalyst geometries will permit growth of nanotubes in specific isolated locations, allowing good access of the feedstock to the catalyst. Structuring the support substrate itself in a way that feedstock permeates the substrate before reaching the catalyst particles, further enhances access of the feedstock to the substrate. Such supported catalysts promote bulk catalytic production of single-wall nanotubes. The catalyst-substrate systems of this invention further promote the growth of nanotubes that are predominantly single-walled tubes in a specific size range, rather than the large irregular-sized multi-walled carbon fibrils that are known to grow from supported catalysts. Catalyst geometry which overcomes the diffusion limitation allows bulk catalytic production of single-wall carbon nanotubes by supported metal catalysts.

The nanoscale particulate transition metal catalyst according to the present invention may be provided on a chemically compatible, refractory nanoscale support particle. The support material must remain solid under reaction conditions, must not poison the catalyst, and must be easily separated from the product after formation. Alumina, carbon, quartz, silicates, and aluminum silicates, such as mullite, are all suitable materials for the support. The support may take the form of spheres, irregularly shaped particles, flakes and the like. Preferred are supports that provide substantially planar surfaces, e.g., flakes. The support may range in size from about 10 nm to centimeters.

Transition Metal Catalyst

A variety of transition metal-containing clusters are suitable as catalysts when used with an appropriate combination of reaction parameters. The transition metal catalyst can be any transition metal that will cause conversion of the carbon-containing feedstock described below into highly mobile carbon radicals that can rearrange at the growing edge to the favored hexagon structure. Suitable materials include transition metals, and particularly the Group VIB chromium (Cr), molybdenum (Mo), tungsten (W) or Group VIIIB transition metals, e.g., iron (Fe), cobalt (Co), nickel (Ni), ruthenium (Ru), rhodium (Rh), palladium (Pd), osmium (Os), iridium (Ir) and platinum (Pt) or mixtures thereof. Metals from the lanthanide and actinide series may also be used. Preferred are Fe, Ni, Co and mixtures thereof, such as a 50/50 mixture (by weight) of Ni and Co or a mixture of Fe/Ni. Any of these transition metals individually or in combination with any of the other transition metals listed may be used in clusters to serve as a catalyst for single-walled carbon nanotube growth. Particularly preferred catalysts are mixtures of two or more of the listed metals.

The transition metal clusters may have a size from about 0.5 nm to over 30 nm. Clusters in the range of 0.5 to 3 nm will produce single-wall nanotubes, while larger clusters tend to produce multiwall nanotubes with outer diameters greater than about 3 µm. In a preferred mode, the larger clusters are inactivated by the process of this invention, with the result that catalytic production of nanotubes using this preferred catalyst will be predominately single-wall nanotubes. The transition metal clusters may be substantially uniformly dispersed on the support surface in close proximity to one another so that the single-wall nanotubes that grow from the support form bundles or ropes of generally aligned single-wall carbon nanotubes. Alternatively, transition metal clusters may be dispersed on the support surface so that there is clear separation between the clusters, so that the single-wall nanotubes that grow from the support are separate from one another.

Catalysts may be prepared using known methods, and can be (i) prepared in advance in Ally active form, (ii) prepared in precursor form followed by an activation step (e.g., treating in an appropriate atmosphere), or (iii) formed in situ in the reaction zone. The catalyst precursors may be those that convert to active form under growth conditions such as oxides, other salts or ligand stabilized metal complexes. As an example, transition metal complexes with alkylamines (primary, secondary or tertiary) can be employed. Similar alkylamine complexes of transition metal oxides also can be employed. In situ formation, as described below, is preferred.

One suitable catalyst preparation method is disclosed in U.S. Pat. No. 5,707,916, (1998), by C. E. Snyder et al., incorporated herein by reference in its entirety. According to this method, fumed alumina (Degussa) is stirred with methanol, and to the resulting slurry is added a methanol solution of metal salts (ferric nitrate and/or bis(acetylacetonato)-dioxomolybdenum (VI). The combined slurry is stirred for several hours, dried in a rotary evaporator, baked in vacuum at 180° C. for 12–15 hours, and ground into a fine powder.

Carbon Source

Suitable carbon-containing compounds include carbon monoxide and hydrocarbons, including aromatic hydrocarbons, e.g., benzene, toluene, xylene, cumene, ethylbenzene, naphthalene, phenanthrene, anthracene or mixtures thereof, non-aromic hydrocarbons, e.g., methane, ethane, propane, ethylene, propylene, acetylene or mixtures thereof; and oxygen-containing hydrocarbons, e.g., formaldehyde, acetaldehyde, acetone, methanol, ethanol or mixtures thereof. In a preferred embodiment, the carbon-containing compound is carbon monoxide (CO) or ethylene ($C_2H_4$).

Conditions Favoring Single-Wall Nanotubes

The reaction step(s) of the present invention that result in the preferential formation of single-wall nanotubes involves contacting the supported metal catalysts with a suitable supply of gaseous carbon-containing compound, initially under conditions that inactivate larger diameter catalyst. Typically, such conditions will force the rate of the catalytic process to be limited by the supply of carbon to the catalyst cluster itself rather than a process that is limited by the rate of diffusion of carbon through the catalyst to the precise location at which carbon atoms are bonding to one another. This can be achieved by lowering the carbon supply to the catalyst, which reduces the carbon concentration in the catalyst particles. A lower carbon concentration will allow the carbon structures to form more slowly, giving each carbon atom more time to anneal to its lowest energetic configuration. The lowest-energy bonded carbon structure on a catalyst particle at least 3 nm in diameter is an encapsulation of the catalyst particle with a graphite-like sheet, while for smaller diameter catalyst particles, the lowest-energy structure is a single-walled nanotube growing the particle.

Lower supply of carbon to the catalyst may be achieved in various ways, depending on the source of gaseous carbon. In the reaction of CO to produce nanotubes, slow carbon supply rate arises because CO decomposition is a bimolecular disproportionation that involves the breaking of two strong CO triple bonds: such a reaction is expected to proceed very slowly except at very high temperatures and pressures much greater than reaction pressure of about 1 atmosphere. The catalytic decomposition of $C_2H_4$ proceeds quickly at about 1 atm.; however, the reaction can be slowed down by limiting the partial pressure of $C_2H_4$ to 0.5 Torr.

Reducing the amount of carbon supplied to the catalytic particle may be accomplished by lowering the gas pressure in the reactor, typically by reducing the feed rate into the reactor. Alternatively, the amount of feedstock added to the gas flow may be reduced to reduce the partial pressure of the feedstock gas in the reactor. Generally, the pressure in the reaction zone should be selected, at least initially, to inactive the larger diameter catalyst particles, while favoring the growth of single-wall nanotubes from the smaller diameter catalyst particles. As described above, the partial pressure at which the carbon supply to the catalytic particles is rate limiting will depend on the reaction mechanism. For example, the partial pressure for CO that meets this condition will be much higher than the partial pressure for ethylene. The initial CO pressure may be from about 0.1 Torr to 10 Atmospheres. Preferably, the initial pressure in the reaction zone is 1.2 Atmospheres.

Evidence that there has been a successful change of the rate-limiting step from carbon diffusion through the catalytic particle to carbon supply to the catalytic particle can be found in three aspects of the catalytic system of this invention. First, the product mass increase rate varies linearly with the hydrocarbon feedstock partial pressure. Second, ignoring termination, the mass growth rate is independent of the reaction temperature from 700° C. to 850° C. If the reaction were limited by diffusion of carbon through the metal, the rate would double from 700° C. to 850° C., assuming an Arrhenius temperature dependence and the activation energy of carbon diffusion through iron. Admittedly, the current experiments only measure a bulk growth rate as opposed to the microscopic growth rate of an individual nanotube. However, assuming that the same number of nanotubes nucleate per unit mass of catalyst, the two rates are proportional. Finally, the bulk growth rate of carbon on the catalyst equals 5% of the mass of carbon in ethylene that flows over the catalyst. Although this is not 100% as would be expected of a supply limited reaction, a simple model assuming laminar flow suggests that only 5% of the ethylene molecules strike the catalyst bed. As will be apparent to the skilled artisan, the carbon feedstock may be recycled through the catalytic reactor to increase utilization of the carbon feedstock. Observing any one of these characteristics, or even all three, for any feedstock will permit the skilled artisan to adjust reaction conditions so that the reaction is limited by the supply of carbon to the catalyst, not the diffusion of carbon through the catalytic particle.

The initial temperature in the reaction vessel may be from about 700° C. to about 1200° C. Preferably, the temperature in the reaction zone is initially 850° C.

After selective inactivation of the larger catalyst particles, the process for forming substantially single-wall nanotubes may either continue with growth of SWNT under the same conditions, or reaction conditions may be changed to enhance production of SWNT by the selective catalyst. In the first step, the reaction zone may be supplied with a precursor under conditions, at least initially, that inactivate catalyst particles that have a diameter large enough to catalyze the production of multi-wall carbon nanotubes. These conditions include exposure of the catalyst particles to CO gas at 1.2 atmospheres. Further, the precursor may be supplied to the reaction zone at a rate that is low enough to cause the inactivation of larger diameter catalyst particles, e.g., particles larger than 3 nm. A typical low flow rate for the precursor may be from about 500 to about 200 sccm in a 1-inch diameter tube furnace. A preferred CO flow rate is about 1200 sccm in a one-inch diameter tube furnace.

Once the larger diameter catalyst particles have been deactivated, the conditions in the reaction zone may be changed to conditions that enhance the production of single-wall carbon nanotubes. This includes increasing the temperature and/or the pressure of CO or changing to another of the carbon-bearing reagent gases mentioned above.

In an alternate embodiment, the conditions in the reaction zone may be selected such that there is no need to change reaction zone conditions to favor the growth of single-wall nanotubes from the smaller diameter catalyst particles after inactivating larger diameter catalyst particles. Conditions initially selected also allow the single-wall nanotubes to remain active under these conditions. For example, the CO pressure in the reaction zone may be from about 500 Torr to about 2000 Torr. The temperature may be from about 600° C. to about 900° C. The flow rate of the precursor may be from about 500 to about 2000 sccm in a 1-inch diameter tube furnace.

The yield of single-wall carbon nanotubes may selectively changed by changing the temperature in the reaction zone. The mass yield of SWNT is temperature dependent, with the yield increasing with increasing temperature. Selectivity can also be affected by temperature, with the product mix varying from 30% double wall nanotubes at 700° C. to 70% double wall nanotubes at 850° C.

Figure 2:
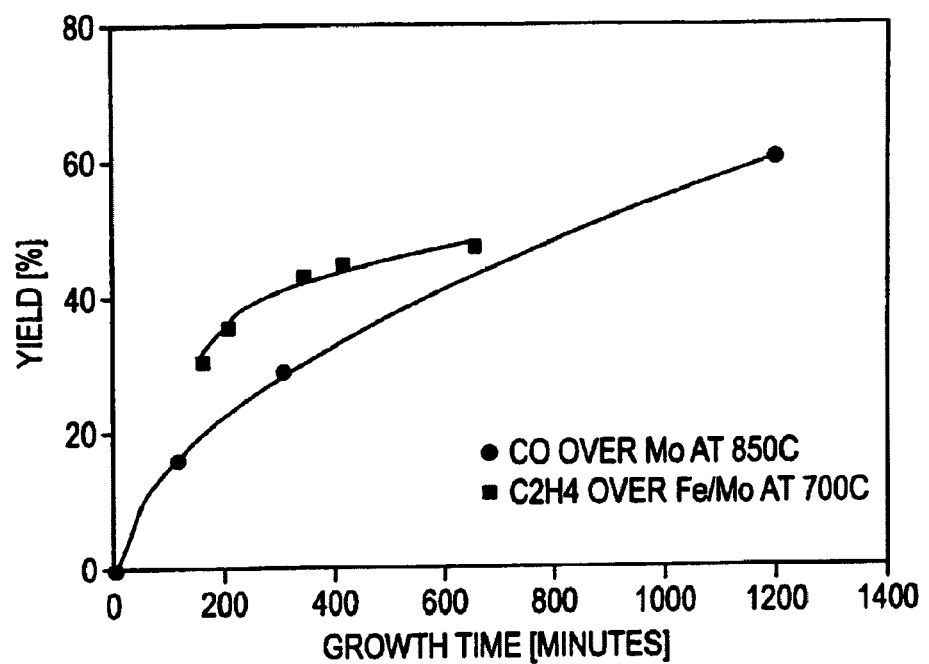
FIG. 2 is a graph of nanotube yield as a function of time for CO over Mo particles and $C_2H_4$ over Fe:Mo particles. The fits give time dependencies of $t^{0.5}$ and $t^{0.4}$ respectively.
Figure 4:
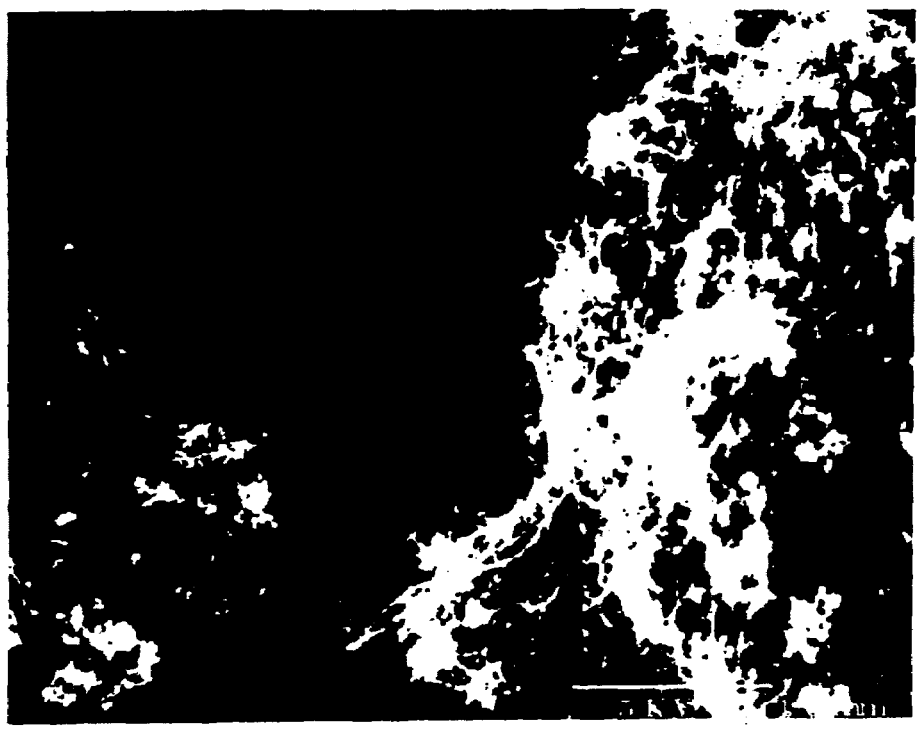
FIG. 4 is a SEM image of nanotube ropes grown at 800° C. in 1000 sccm Ar, 0.66 sccm $C_2H_4$, 0.33 sccm $H_2$.

As shown in FIGS. 1 and 4, both CO disproportionation over Mo catalyst particles at 850° C. and the reaction of $C_2H_4$ with Fe/Mo particles at 700° C. appear to generate single-wall carbon nanotubes that grow continuously without termination of the growth reaction. These results constitute the first demonstration of continuous generation of single-wall carbon nanotubes with lengths that are, in principle, arbitrarily long. In practice, however, the mass of the grown nanotubes exhibits a time dependence that is less than linear, so that growth slows more and more with increasing time (a fit of the data sets in FIG. 2 give roughly square root dependencies of yield on time). This slowing growth may be due to the increasing diffusion time of the carbon feedstock molecules through the thickening mat of nanotubes surrounding the catalyst particles.

Figure 6:
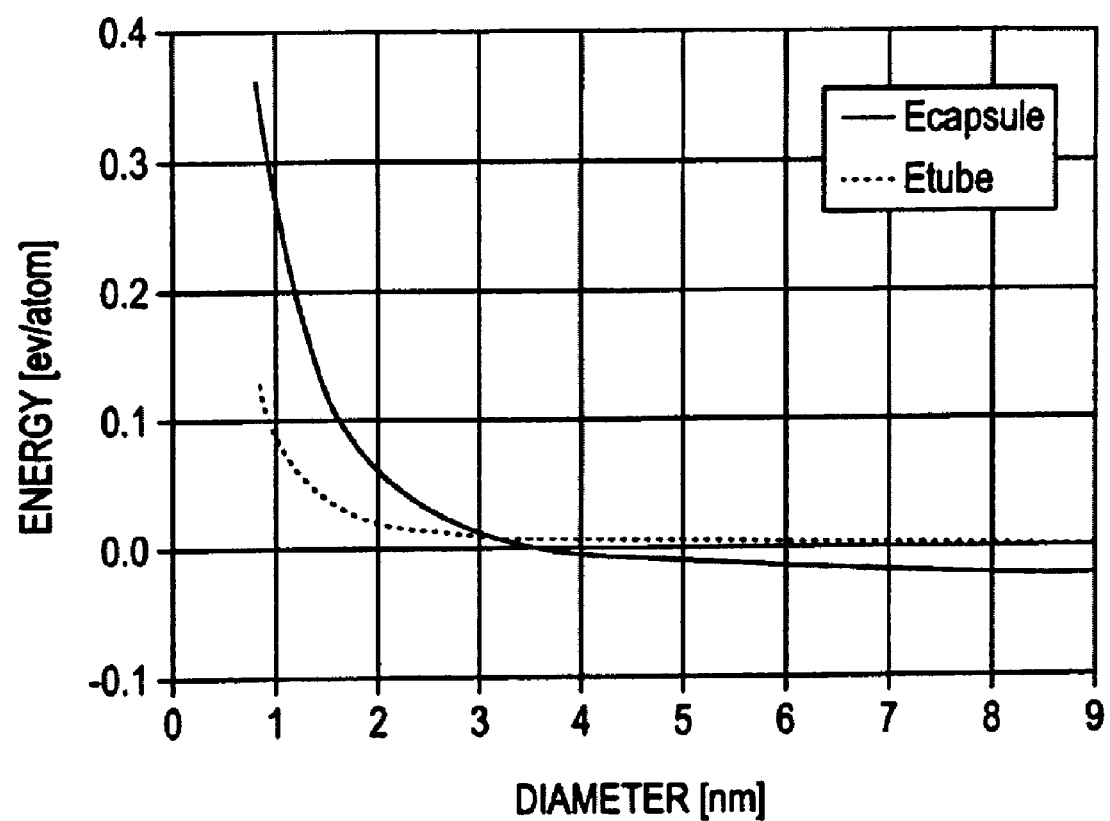
FIG. 6 is a graph of the energies of capsules and single wall nanotubes relative to an infinite graphene sheet.

Without intending to be bound by a particular mechanism, the inventors believe that the basis for the present invention is that the energetics of structures that could grow off of the catalyst particles by calculating the energy per carbon atom as a function of structure size are considered. For single-wall carbon nanotubes, the caps were neglected in favor of the vastly greater number of carbon atoms in the side walls. The energies of carbon atoms at the nanotube-metal interface and nanotube ends were neglected since only the final product energies, not nucleation or growth mechanisms, are considered. A graphene capsule entirely surrounding the catalyst particle was also considered. For all catalyst particle diameters, one expects the graphene cylinder to be lower in energy than the capsule since the cylinder has only simple curvature compared with the complex curvature of the capsule. However, the attractive interaction between the graphene capsule and the metal particle will lower the energy per atom of the capsule. Simple formulas for the energies of curved graphene sheets for the nanotubes and large fullerenes for the capsules were used. An estimate for the graphene-metal interaction was taken from an experimental measurement of the energy of the graphite ferrite interface. The result, displayed in FIG. 6, shows that the nanotube energy is lower than that of the capsule in a diameter range similar to the single-wall carbon nanotube diameters. These calculations lend support to the hypothesis that supply-limited growth allows more time to anneal to the lowest energy structure so that smaller particles produce nanotubes while larger particles are encapsulated. This model could give further insight into the presence or absence of double-wall carbon nanotubes and multi-walled nanotubes if the relative graphene—graphene and graphene-metal interaction strengths were well-known.

For experiments in which the reaction time is short, it has been observed that the single-wall carbon nanotubes grow with a particle at one end and closed at the other. This supports nucleation of these nanotubes by the yarmulke mechanism in which a hemispherical graphene cap forms on the catalyst particles and lifts off to nucleate closed nanotubes.

Product

SWNT produced by the method of this invention are substantially free of amorphous or pyrolytic carbon (i.e., none is observed in TEM of the nanotubes) unless the process is carried out with excess hydrocarbon feedstock. The product of a typical process for making mixtures containing single-wall carbon nanotubes is a tangled felt, which can include deposits of amorphous carbon, graphite, metal compounds (e.g., oxides), spherical fullerenes, catalyst particles (often coated with carbon or fullerenes) and possibly multi-wall carbon nanotubes. The single-wall carbon nanotubes may be aggregated in "ropes" or bundles of essentially parallel nanotubes.

Nanotubes prepared using the catalytic method of this invention tend to be less contaminated with pyrolytic or amorphous carbon than nanotubes prepared by prior art methods. Furthermore, by using a catalyst with a narrow size distribution, the nanotubes produced consequently have a narrow size distribution. This will minimize the need for post-production activities to clean up the nanotube preparation. To the extent that the nanotube product contains pyrolytic carbon which needs to be removed, various procedures are available to the skilled artisan for cleaning up the product. Suitable processes for purifying carbon nanotubes prepared according to this invention include the processes described in International Patent Publication WO 98/39250.

According to the invention, predominantly single-wall carbon nanotubes, with a portion of double-wall carbon nanotubes under some conditions, are produced with diameters in the range from about 0.5 to about 3 nm. Typically, no 5 to 20 nm diameter multi-walled nanotubes are produced by supported catalyst particles. The key difference responsible for these effects is that the growth reaction rate is limited by the supply of carbon to the catalyst particles, whereas the multi-walled nanotube growth is thought to be limited by the diffusion of carbon through the catalyst particles.

The single-wall nanotubes of the present invention may have lengths exceeding one micron. The length may be controlled by lengthening or shortening the amount of time the catalyst is exposed to the feedstock gas at an appropriate temperature and pressure. In one embodiment, under proper conditions the single-wall nanotubes can grow continuously to an arbitrary length.

Single-wall nanotubes formed in the present invention are observed to form into organized bundles or "ropes" as they grow from catalyst particles in close proximity to each other. Examples of this behavior are shown in FIG. 4b. Such ropes of SWNT may be removed from the supported catalyst for subsequent processing and/or utilization, or they may be used "as is" while still attached to the catalyst particle. SWNT prepared according to this invention using a supported catalyst with widely dispersed catalytic particles may be recovered prior to aggregation of the individual nanotubes. These nanotubes may be collected in the form of a mat or felt with random orientation in two dimensions or individually for particular uses.

Using the Product Nanotubes

Carbon nanotubes, and in particular the single-wall carbon nanotubes of this invention, are useful for making electrical connectors in micro devices such as integrated circuits or in semiconductor chips used in computers because of the electrical conductivity and small size of the carbon nanotube. This invention provides a means of establishing a carbon nanotube directly in contact with a surface, but extending away from that surface. This occurs naturally in the present invention as the tube is grown from a catalyst particle in contact with the surface of a larger object (the catalyst support). This invention's provision of a simple means for creating structures that comprise a support surface with one or more nanotubes attached and extending away from that surface is particularly useful in known applications of nanotubes as probes in scanning tunneling microscopes (STM) and atomic force microscopes (AFM) and as field emitters of electrons for electronic applications. The carbon nanotubes are useful as antennas at optical frequencies, and as probes for scanning probe microscopy such as are used in scanning tunneling microscopes (STM) and atomic force microscopes (AFM). The carbon nanotubes are also useful as supports for catalysts used in industrial and chemical processes such as hydrogenation, reforming and cracking catalysts. The nanotubes may be used, singularly or in multiples, in power transmission cables, in solar cells, in batteries, as antennas, as molecular electronics, as probes and manipulators, and in composites.

EXAMPLE

In order to facilitate a more complete understanding of the invention, an Example is provided below. However, the scope of the invention is not limited to specific embodiments disclosed in this Example, which is for purposes of illustration only.

1. Preparation

Single wall carbon nanotubes may be grown by passing carbon-containing gases (CO or $C_2H_4$) at elevated temperatures over nanometer-size metal particles supported on larger (10–20 nm) alumina particles. Two different metal catalysts may be used, one containing pure Mo, the other containing Fe and Mo. The ratio of FE to Mo may be 9:1. Both catalysts were made using a method known in the art.

For each growth experiment, a quartz boat containing a carefully weighed amount (typically 20 mg) of the catalyst powder was placed in the center of a 1 inch quartz tube furnace. The system was purged with Ar, then heated under flowing reactant gases to an elevated temperature for a controlled time. The resulting catalyst material, which now also contains reaction products dominated by single-wall carbon nanotubes, was removed from the boat and weighed again. The yield is defined as the mass increase divided by the original catalyst mass. Samples were prepared for TEM imaging by sonicating this material in methanol and dropdrying the resulting suspension onto TEM grids.

2. Production of Single-Wall Carbon Nanotubes

The production of single-wall carbon nanotubes by the disproportionation of CO over alumina-supported Mo particles is greatly improved. The catalyst is 34:1 alumina:Mo by mass. The reaction is carried out at 850° C. under a flow of 1200 sccm of CO at 900 Torr. The resulting material, which consists of single-wall carbon nanotube very monodisperse in diameter (0.8 to 0.9 nm), is shown in FIG. 1. Particles of the fumed alumina support, 10 to 20 nm in size, are also visible in this and subsequent TEM images. The yield of nanotubes is plotted as a function of reaction time in FIG. 2. The yield continues to increase even for very long reaction times.

Figure 3:
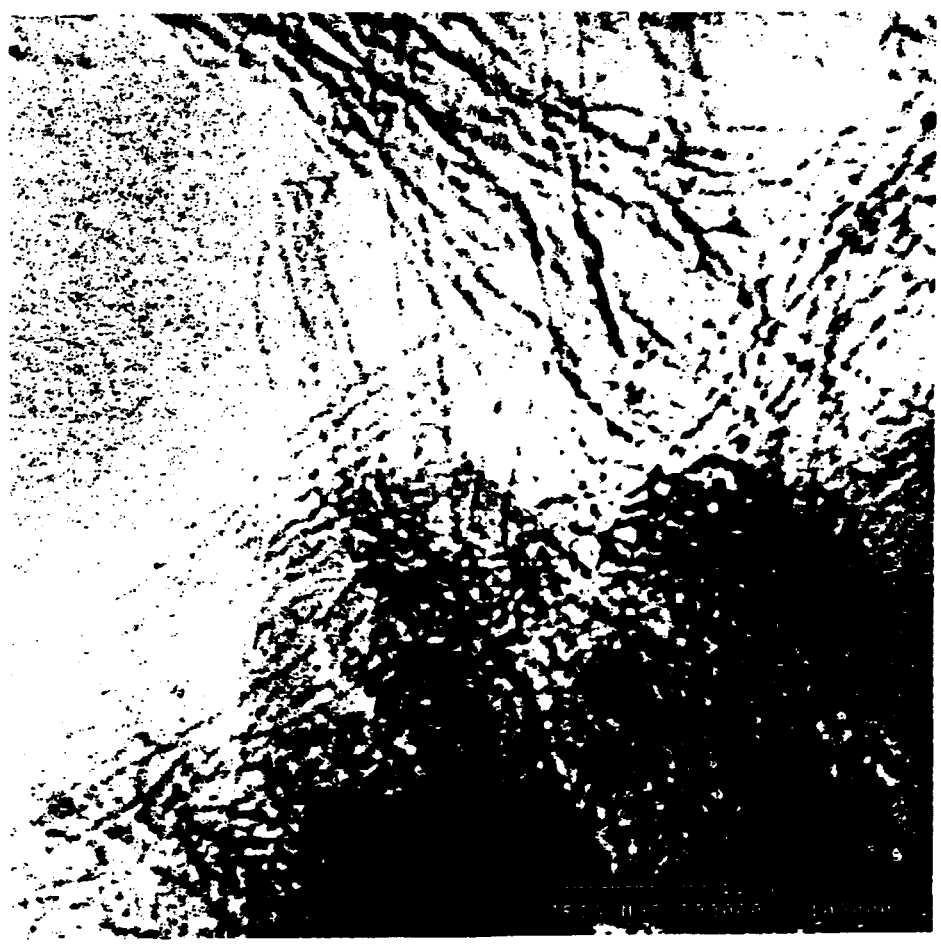
FIG. 3 is a TEM image of single-wall carbon nanotube grown at 850° C. by 1200 sccm CO over an alumina:Fe:Mo catalyst.

CO also forms nanotubes with a second catalyst. The second catalyst is prepared with 90:9:1 alumina:Fe:Mo by mass. The reaction, when carried out exactly as described above for the alumina:Mo catalyst, yields nanotubes of a wider diameter distribution, 0.5 to 3 nm, with single-wall carbon nanotubes and some double-wall carbon nanotubes. A representative TEM image is shown in FIG. 3. For this catalyst, the yield increases with time initially, but is limited to about 40% after one hour of exposure. No additional mass increase is observed even for much longer exposures (up to 20 hours).

Figure 5:
FIG. 5 is a TEM of the same material that shows ropes that consist of nanotubes of diameter 0.5 nm –3 nm and 1 or 2 walls, respectively.

Single-wall carbon nanotubes from $C_2H_4$ have been grown using this technique. The 90:9:1 alumina:Fe:Mo catalyst is first reduced by exposing the catalyst to 1000 sccm Ar and 0.33 sccm $H_2$ at 800° C. for 30 minutes. The growth reaction then proceeds at the reaction temperature by adding 0.66 sccm $C_2H_4$ to the gas flow. The resulting product is nanotube bundles containing single-wall carbon nanotubes and double-wall carbon nanotubes, shown in FIGS. 4 and 5. One hundred nanotube cross sections were observed at several reaction temperatures to count the relative number of single- to double-walled nanotubes. The amount of double-wall carbon nanotubes increases from 30% at 700° C. to 70% at 850° C. Outer diameters of the individual tubes in a bundle range from 0.5 to 3 nm. There appears to be no correlation between outer diameter and number of walls, other than that the smallest nanotubes (<1 nm diameter) are never double-walled.

The mass yield of nanotubes increases at a similar rate for reaction temperatures from 700° C. to 850° C., but the termination is temperature dependent. For reactions at 850° C., the yield increases until it reaches 7%, at which point the growth terminates. As the reaction temperature is lowered, the yield reaches higher levels before growth termination. At 700° C., the growth does not terminate, but its rate decreases as shown in FIG. 2.

The present invention demonstrates the ability to grow nanotubes by catalytic decomposition of $C_2H_4$ and CO only from the small particles in a supported catalyst system, leading to the growth of single-wall carbon nanotubes and deactivation of multi-walled nanotube growth by encapsulation of larger particles. For certain conditions, nanotubes can be grown to arbitrary length, but become limited by the diffusion of reactants to the catalyst particles. This problem has been solved for the production of multi-walled nanotubes from this catalyst by using flat alumina flakes, as opposed to fumed alumina particles, so that the nanotubes grow aligned in large bundles, keeping their growing ends exposed to the gaseous feedstock. Similar modifications to the current technique may allow the bulk production of single-wall carbon nanotubes.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

The invention claimed is:

1. A method for producing carbon nanotubes comprising:
   contacting metal catalyst particles in a reaction zone maintained at an elevated temperature with a carbon-containing compound to produce carbon nanotubes, wherein the carbon nanotubes predominately have no more than two walls and wherein at least about 30% of the carbon nanotubes are double-wall carbon nanotubes.

2. The method of claim 1, wherein the metal catalyst particles comprise at least one metal selected from the group consisting of Group VIB transition metals, Group VIIIB transition metals, lanthanide series metals, actinide series metals, and mixtures thereof.

3. The method of claim 1, wherein the metal catalyst particles comprise a Group VIB transition metal and a Group VIIIB transition metals.

4. The method of claim 3, wherein the Group VIB transition metal is selected from the group consisting of chromium, molybdenum and tungsten.

5. The method of claim 3, wherein the Group VIIIB transition metal is selected from the group consisting of iron, cobalt, nickel, ruthenium, rhodium, palladium, osmium, iridium and platinum.

6. The method of claim 3, wherein the Group VIIIB transition metal is iron.

7. The method of claim 6, wherein the Group VIB transition metal is molybdenum.

8. The method of claim 3, wherein the Group VIB transition metal is molybdenum.

9. The method of claim 1, wherein the metal catalyst particles are introduced in the reaction zone with a support.

10. The method of claim 9 wherein the support is carbon.

11. The method of claim 9, wherein the support is an oxide compound.

12. The method of claim 11 wherein the oxide compound is selected from the group consisting of alumina, quartz, silicates, aluminum silicates, mullite, and mixtures thereof.

13. The method of claim 9 wherein the support is a metal oxide.

14. The method of claim 9, wherein the support is alumina.

15. The method of claim 1, wherein the carbon-containing compound is selected from the group consisting of carbon monoxide, aromatic hydrocarbons, non-aromatic hydrocarbons, oxygen-containing hydrocarbons, other hydrocarbons, and mixtures thereof.

16. The method of claim 15, wherein the aromatic hydrocarbon is selected from the group consisting of benzene, toluene, xylene, cumene, ethylbenzene, naphthalene, phenanthrene, anthracene, and mixtures thereof.

17. The method of claim 15, wherein the non-aromatic hydrocarbon is selected from the group consisting of methane, ethane, propane, ethylene, propylene, acetylene, and mixtures thereof.

18. The method of claim 15, wherein the oxygen-containing hydrocarbon is selected from the group consisting of formaldehyde, acetaldehyde, acetone, methanol, ethanol, and mixtures thereof.

19. The method of claim 1, wherein at least about 70% of the carbon nanotubes are double-wall carbon nanotubes.

20. The method of claim 1, wherein the carbon-containing compound is ethylene.

21. The method of claim 1, wherein the carbon-containing compound is carbon monoxide.

22. The method of claim 1, wherein the temperature in the reaction zone ranges between about 600° C. and about 900° C.

23. The method of claim 1, wherein the temperature in the reaction zone ranges between about 700° C. and about 850° C.

24. A method for producing carbon nanotubes comprising:
   (a) contacting metal catalyst particles introduced with a support in a reaction zone maintained at an elevated temperature with a carbon-containing compound under conditions such that the metal catalyst particles which are large enough to primarily produce carbon nanotubes with more than two walls are deactivated; and
   (b) growing carbon nanotubes from the metal catalyst particles in the reaction zone, wherein the carbon nanotubes predominately have no more than two walls and wherein at least about 30% of the carbon nanotubes are double-wall carbon nanotubes.

25. The method of claim 24, wherein an amount of metal catalyst particles are deactivated such that at least 70% of the carbon nanotubes produced have at most two walls.

26. The method of claim 1, wherein a portion of the carbon nanotubes are in the form of ropes.

27. The method of claim 26 wherein the ropes comprise double-wall carbon nanotubes.

28. The method of claim 24, wherein a portion of the carbon nanotubes are in the form of ropes.

29. The method of claim 28 wherein the ropes comprise double-wall carbon nanotubes.

* * * * *